(12) United States Patent
Mefford et al.

(10) Patent No.: US 9,915,754 B2
(45) Date of Patent: Mar. 13, 2018

(54) METHOD AND APPARATUS FOR DETECTING ENERGETIC MATERIALS

(71) Applicant: The Boeing Company, Chicago, IL (US)

(72) Inventors: David Keith Mefford, Huntsville, AL (US); Robert Alan Smith, Huntsville, AL (US); John Dalton Williams, Decatur, AL (US)

(73) Assignee: THE BOEING COMPANY, Chicago, IL (US)

( * ) Notice: Subject to any disclaimer, the term of this patent is extended or adjusted under 35 U.S.C. 154(b) by 193 days.

(21) Appl. No.: 14/725,236

(22) Filed: May 29, 2015

(65) Prior Publication Data
US 2016/0349401 A1    Dec. 1, 2016

(51) Int. Cl.
*G01V 8/00* (2006.01)
*G01J 3/02* (2006.01)
*G01V 8/10* (2006.01)

(52) U.S. Cl.
CPC ............ *G01V 8/005* (2013.01); *G01J 3/0272* (2013.01); *G01V 8/10* (2013.01)

(58) Field of Classification Search
CPC .......... G01J 3/0272; G01N 2201/0221; G01N 2021/558; G01N 33/22
See application file for complete search history.

(56) References Cited

U.S. PATENT DOCUMENTS

| 5,073,782 | A  | * | 12/1991 | Huguenin | ............... G01S 7/024 250/332 |
| 8,253,619 | B2 | * | 8/2012  | Holbrook | ............... H04N 1/107 324/323 |
| 2007/0222981 | A1 | * | 9/2007  | Ponsardin | ................. G01J 3/02 356/301 |
| 2010/0309454 | A1 | * | 12/2010 | Zhang    | ....................... G01J 3/02 356/39 |
| 2010/0314545 | A1 | * | 12/2010 | Logan, Jr. | ................. G01J 3/10 250/339.07 |

OTHER PUBLICATIONS

Goyal et al., "Active infrared multispectral imaging of chemicals on surfaces," SPIE Chemical, Biological, Radiological, Nuclear, and Explosives (CBRNE) Sensing XII, vol. 8018, Jun. 2011, 11 pages.
Hinkov et al., "Broad band tunable quantum cascade lasers for stand-off detection of explosives," SPIE Optically Based Biological and Chemical Detection for Defence V, vol. 7484, Aug. 2009, 13 pages.
Morales-Rodriguez et al., "Standoff imaging of chemicals using IR spectroscopy," SPIE Micro- and Nanotechnology Sensors, Systems, and Application III, vol. 8031, Apr. 2011, 8 pages.

* cited by examiner

*Primary Examiner* — Kenneth J Malkowski
(74) *Attorney, Agent, or Firm* — Yee & Associates, P.C.

(57) ABSTRACT

A method and apparatus for detecting an energetic material on a surface. Electromagnetic radiation is generated. A beam of the electromagnetic radiation is transmitted from a handheld device towards the surface. Reflected electromagnetic radiation from the beam reflecting off of the surface is detected at the handheld device to generate test data. The test data is analyzed at a base unit that is separate from the handheld device to determine whether the energetic material is present on the surface.

19 Claims, 9 Drawing Sheets

METHOD AND APPARATUS FOR DETECTING ENERGETIC MATERIALS

BACKGROUND INFORMATION

1. Field

The present disclosure relates generally to detecting energetic materials and, in particular, to a method and apparatus for detecting the presence of an energetic material on a surface using a handheld device for performing the test and a base unit connected to the handheld device for processing the data.

2. Background

Public safety is one of the most important concerns in public venues including, but not limited to, airports, train stations, convention centers, stadiums, and other types of public venues. Various systems and protocols have been put in place over the years to ensure public safety. For example, airports routinely use X-ray scanning devices to test for the presence of explosives and weapons hidden within baggage. Some airports use "sniffing" devices that absorb particulate or vapor matter and analyze this matter for the presence of explosive material. In certain public areas, dogs are trained to detect explosive materials.

Some public venues, such as airports, also test surfaces for explosive residue. Explosive residue may be trace evidence of an explosive that typically includes one or more energetic materials. An energetic material is a material that has a high amount of stored chemical energy that can be released.

Many currently available methods for testing surfaces for explosive residue take longer than desired. For example, at airports, Transportation Security Administration (TSA) officers may use a cloth to swab the hands and baggage handles of passengers. This cloth is then inserted into a device, such as a mass spectrometer or gas chromatograph device, for analysis. However, this process is time-consuming and can lead to increased wait times at the airport. Consequently, oftentimes, only a random sampling of passengers and baggage are selected for testing.

Further, a wide variety of energetic materials may be used to make explosives. However, some currently available detection devices are capable of detecting only certain types of energetic materials and incapable of detecting other types of energetic materials. While some complex detection devices are able to detect a wider range of energetic materials than other detection devices, these complex detection devices are oftentimes heavier, more complex, and larger than desired. Therefore, it would be desirable to have a method and apparatus that take into account at least some of the issues discussed above, as well as other possible issues.

SUMMARY

In one illustrative embodiment, a method for detecting an energetic material on a surface is provided. Electromagnetic radiation is generated. A beam of the electromagnetic radiation is transmitted from a handheld device towards the surface. Reflected electromagnetic radiation from the beam reflecting off of the surface is detected at the handheld device to generate test data. The test data is analyzed at a base unit that is separate from the handheld device to determine whether the energetic material is present on the surface.

In another illustrative embodiment, an apparatus comprises a handheld device and a base unit that is separate from the handheld device. The handheld device transmits a beam of electromagnetic radiation towards a surface. The handheld device detects reflected electromagnetic radiation from the beam reflecting off of the surface to generate test data. The base unit analyzes the test data to determine whether an energetic material is present on the surface.

In yet another illustrative embodiment, a testing system comprises a handheld device and a base unit that is separate from the handheld device. The handheld device comprises a beamformer and a detector. The beamformer transmits a beam of polarized infrared radiation towards a surface to be tested. The detector detects reflected infrared radiation from the beam reflecting off of the surface to generate test data. The base unit comprises a laser system and a data manager. The laser system generates a set of laser signals comprising the polarized infrared radiation and sends the set of laser signals to the beamformer. The data manager analyzes the test data to determine whether an energetic material is present on the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a detection system capable of reducing the time needed for testing surfaces for energetic materials. Further, the illustrative embodiments recognize and take into account that it may be desirable to have a detection system capable of testing a wide range of energetic materials without increasing the complexity, size, weight, and cost of the detection system more than desired.

In particular, the illustrative embodiments recognize and take into account that it may be desirable to have a detection system that includes a handheld device for testing surfaces and a separate base unit for processing test data generated from testing the surfaces. By moving processing functions onto a base unit that is separate from the handheld device, the weight and size of the handheld device may be reduced. The reduced weight and size of the handheld device may make it easier for an operator to use the handheld device and to position the handheld device relative to different surfaces.

Further, the illustrative embodiments recognize and take into account that it may be desirable to place the components necessary for generating laser signals for testing on the base unit. For example, when testing for a wide variety of energetic materials, it may be desirable to use multiple laser signals that span a wide range of bandwidths. By moving the components needed for generating these laser signals onto a base unit and then transmitting these laser signals over, for example, without limitation, fiber-optic cables to a handheld device, the size and weight of the handheld device may be kept small and low, respectively.

Thus, the illustrative embodiments provide a method and apparatus for detecting energetic materials on different types of surfaces. In one illustrative example, a method for detecting an energetic material on a surface includes generating electromagnetic radiation. A beam of the electromagnetic radiation is then transmitted from a handheld device towards the surface. Reflected electromagnetic radiation from the beam reflecting off of the surface is detected at the handheld device to generate test data. The test data is analyzed at a base unit that is separate from the handheld device to determine whether the energetic material is present on the surface.

The method described above provides a non-contact approach for testing that may enable surfaces, such as passenger hands and baggage handles, to be tested for the presence of energetic materials quickly. For example, a surface may be effectively tested using this approach in less than about 10 seconds.

Figure 1:
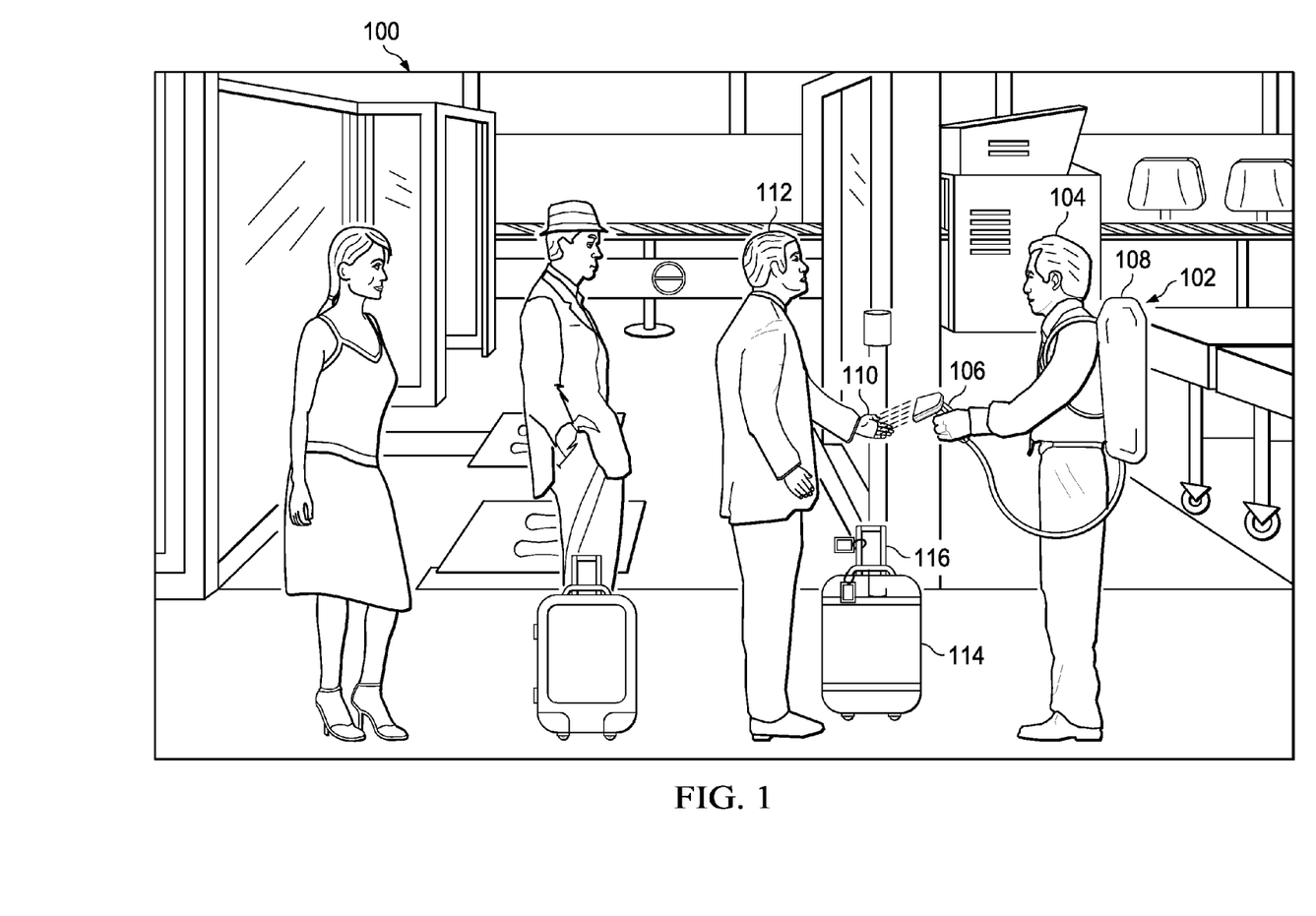
FIG. 1 is an illustration of an airport in accordance with an illustrative embodiment.

Referring now to the figures and, in particular, with reference to FIG. 1, an illustration of an airport is depicted in accordance with an illustrative embodiment. Airport 100 is an example of one type of environment in which surfaces may need to be tested for the presence of energetic materials.

Detection system 102 may be used by operator 104 to test for the presence of energetic materials on surfaces at airport 100. In this illustrative example, these surfaces may include the surfaces of baggage, baggage handles, passenger hands and fingers, passenger shoes, and other types of surfaces.

As depicted, detection system 102 includes handheld device 106 and base unit 108. Base unit 108 is implemented in the form of a backpack. In this illustrative example, operator 104 uses handheld device 106 to test hand 110 of person 112 for the presence of an energetic material. Handheld device 106 may be powered by base unit 108. Further, the data collected by handheld device 106 may be processed by base unit 108 to determine whether any energetic materials are present on hand 110 of person 112. Handheld device 106 may also be used to test other surfaces, such as the surface of baggage 114 and baggage handle 116.

Detection system 102 is implemented in a manner that allows a surface, such as the surface of hand 110, to be tested rapidly. In this illustrative example, the results of testing hand 110 may be displayed to operator 104 on handheld device 106 in less than about 10 seconds. This type of detection system 102 may enable operator 104 to quickly and easily perform tests for energetic materials on passengers and their baggage without increasing wait times more than desired. Consequently, substantially all passengers may be tested rather than a sampling of passengers without increasing wait times more than desired.

Figure 2:
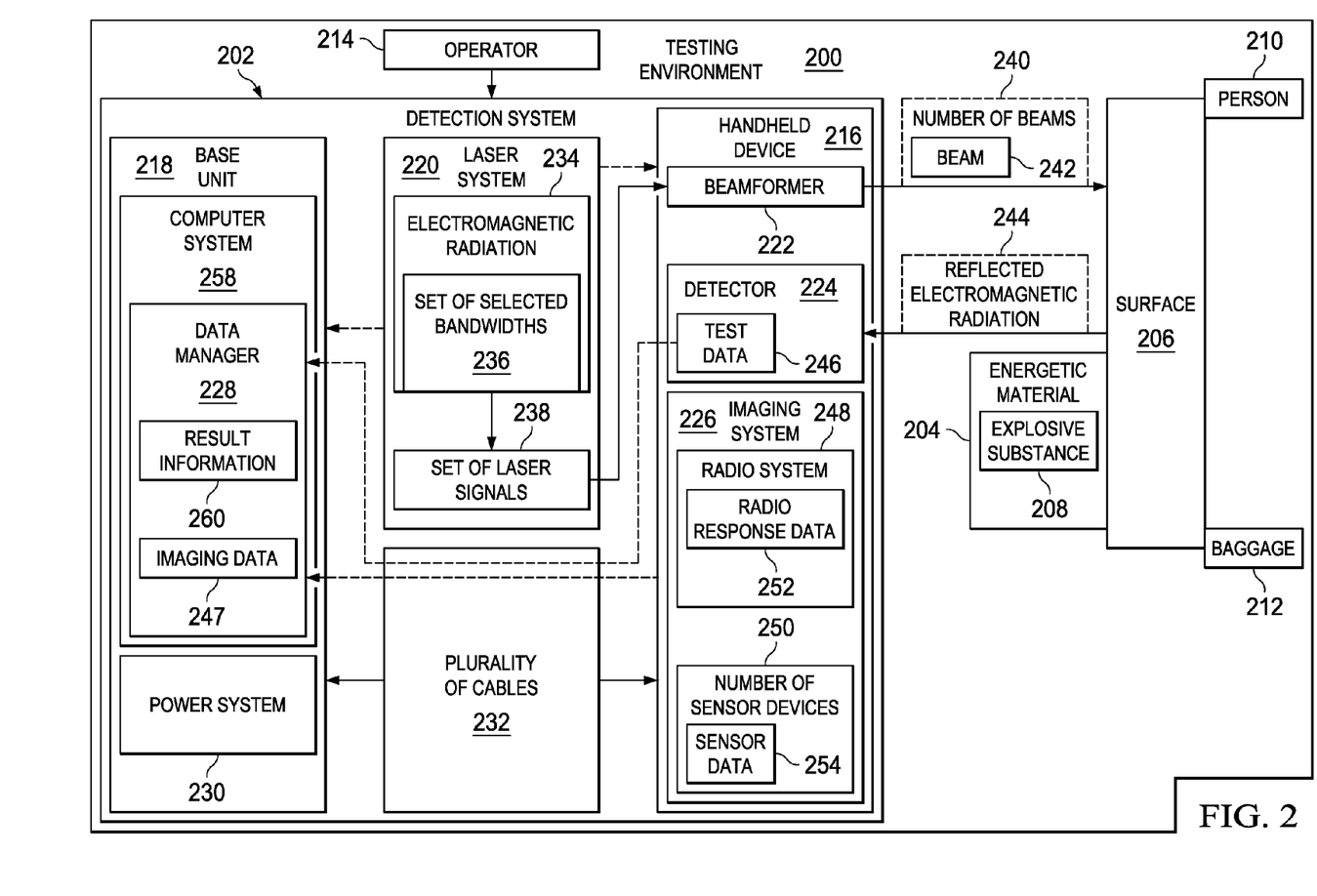
FIG. 2 is an illustration of a testing environment in the form of a block diagram in accordance with an illustrative embodiment.

With reference now to FIG. 2, an illustration of a testing environment is depicted in the form of a block diagram in accordance with an illustrative embodiment. In this illustrative example, testing environment 200 is an example of an environment in which it may be desirable to quickly and effectively test surfaces for the presence of energetic materials.

Airport 100 in FIG. 1 is an example of one implementation for testing environment 200. In other illustrative examples, testing environment 200 may take the form of a train station, a bus station, a convention center, a stadium, an arena, a public park, a meeting place, or some other type of venue or environment.

Detection system 202 may be used to test for the presence of energetic materials on various surfaces of testing environment 200. For example, detection system 202 may be used to search for the presence of energetic material 204 on surface 206. Energetic material 204 may be any energetic material of interest. In one illustrative example, energetic material 204 may be any substance that is used in explosives, propellants, fuels, or other types of potentially dangerous materials. In one illustrative example, detection system 202 is used to test for the presence of energetic material 204 in the form of explosive substance 208 on surface 206.

Surface 206 may be any surface on which energetic material 204 may be expected to be present in trace amounts. For example, without limitation, surface 206 may include at least one of a surface of a hand, a surface of a finger, a surface of baggage, a surface of a baggage handle, a surface of a shoe, a surface of clothing, or some other type of surface. In this manner, surface 206 may be on person 210, baggage 212, or some other type of object.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

Detection system 202 is configured to be operated by operator 214. As depicted, detection system 202 includes handheld device 216 and base unit 218. Detection system 202 also includes laser system 220, beamformer 222, detector 224, imaging system 226, data manager 228, power system 230, and plurality of cables 232. As used herein, a "number of" items may include one or more items. In this manner, plurality of cables 232 may include one or more cables.

Further, as used herein, when one component is "associated" with another component, the association is a physical association in the depicted examples. For example, a first component, such as laser system 220, may be considered to be associated with a second component, such as base unit 218, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both. In some illustrative examples, a first component may be associated with a second component by being housed within the second component.

Handheld device 216 has a shape and size that enable handheld device 216 to be easily handled and operated by operator 214. Base unit 218 is separate from handheld device 216. In one illustrative example, base unit 218 may be implemented in the form of a backpack that operator 214 may wear while using handheld device 216. In another illustrative example, base unit 218 may be implemented in the form of a floor-mounted unit, a tabletop unit, a portable unit, or some other type of unit that may be positioned near operator 214 while operator 214 uses handheld device 216.

Laser system 220 may be associated with at least one of handheld device 216 or base unit 218, depending on the implementation. Laser system 220 generates electromagnetic radiation 234 that spans set of selected bandwidths 236. As used herein, a "set of" items may include one or more items. In this manner, set of selected bandwidths 236 may include one or more bandwidths.

Each selected bandwidth in set of selected bandwidths 236 may be a range of frequencies, which, in turn, may correspond to a range of wavelengths. In one illustrative example, laser system 220 may comprise a set of laser devices that generates set of laser signals 238 comprising electromagnetic radiation 234 that spans set of selected bandwidths 236. In other words, each of set of laser signals 238 may comprise electromagnetic radiation 234 that spans a corresponding selected bandwidth of set of selected bandwidths 236. Set of selected bandwidths 236 may be selected such that a wide variety of energetic materials may be detected.

In some illustrative examples, laser system 220 may take the form of a single laser device that generates a single laser signal that spans a selected bandwidth. In other illustrative examples, laser system 220 may take the form of a single laser device that generates multiple laser signals spanning multiple selected bandwidths. In still other illustrative examples, laser system 220 may take the form of multiple laser devices, each of which generates a single laser signal or multiple laser signals.

As the number of laser devices in laser system 220 increases such that the number of laser signals capable of being generated is increased, laser system 220 may become larger. Consequently, it may be desirable to associate laser system 220 with base unit 218. In this manner, handheld device 216 may have a smaller size and lower weight.

As depicted, beamformer 222 is associated with handheld device 216. Beamformer 222 may receive electromagnetic radiation 234 and form number of beams 240 of electromagnetic radiation 234. For example, beamformer 222 may receive set of laser signals 238 comprising electromagnetic radiation 234 and form number of beams 240 of electromagnetic radiation 234. When laser system 220 is located within base unit 218, beamformer 222 receives set of laser signals 238 through at least one of plurality of cables 232. Beam 242 may be an example of one of number of beams 240.

Beamformer 222 is configured to transmit number of beams 240 out of handheld device 216. In one illustrative example, beamformer 222 transmits number of beams 240 simultaneously through a single aperture or multiple apertures in handheld device 216. In some cases, multiple beams may be simultaneously transmitted through a single aperture in handheld device 216. In other illustrative examples, beamformer 222 may transmit each of number of beams 240 one at a time through one or more apertures in handheld device 216.

Beamformer 222 transmits number of beams 240 towards surface 206. In one illustrative example, number of beams 240 may be used to illuminate at least a portion of surface 206 that is to be tested for the presence of energetic material 204. In response to number of beams 240 encountering surface 206, at least a portion of electromagnetic radiation 234 in number of beams 240 may be reflected off of surface 206. At least a portion of electromagnetic radiation 234 may be some or all of electromagnetic radiation 234.

Reflected electromagnetic radiation 244 may be the reflection of electromagnetic radiation 234 off of surface 206. Detector 224 is configured to detect reflected electromagnetic radiation 244. As depicted, detector 224 is associated with handheld device 216 in these illustrative examples. Detector 224 detects reflected electromagnetic radiation 244 and converts reflected electromagnetic radiation 244 into one or more electrical signals that form test data 246.

In one illustrative example, imaging system 226 is associated with handheld device 216. Imaging system 226 may comprise one or more components for use in generating data that may be used to form imaging data 247. Imaging data 247 may include a number of images that capture at least one of surface 206, the spatial environment around surface 206, or the spatial environment around handheld device 216. These images may include at least one of a two-dimensional image or a three-dimensional image.

In one illustrative example, imaging system 226 includes radio system 248, number of sensor devices 250, or both. Radio system 248 generates radio waves and transmits radio waves. Reflected radio waves may then be detected by radio system 248 to generate radio response data 252. Number of sensor devices 250 may generate sensor data 254.

Test data 246 generated by detector 224, radio response data 252, and sensor data 254 are sent to base unit 218 for processing. In one illustrative example, this data may be sent to base unit 218 over at least one of plurality of cables 232. In other illustrative examples, the data may be sent to base unit 218 over one or more wireless communications links.

In this illustrative example, test data 246 generated by detector 224, radio response data 252, and sensor data 254 are sent to data manager 228 associated with base unit 218 for processing. Data manager 228 may be implemented using hardware, firmware, software, or a combination thereof. In one illustrative example, data manager 228 may be implemented using computer system 258.

Data manager 228 processes test data 246 to determine whether energetic material 204 is present on surface 206.

The results of this processing form result information 260. Result information 260 may indicate, for example, without limitation, whether the test of surface 206 is positive, negative, or inconclusive.

In addition to computer system 258, power system 230 is also associated with base unit 218. Power system 230 may provide power to the components of both base unit 218 and handheld device 216. In one illustrative example, power system 230 may send power to handheld device 216 over at least one of plurality of cables 232.

Figure 3:
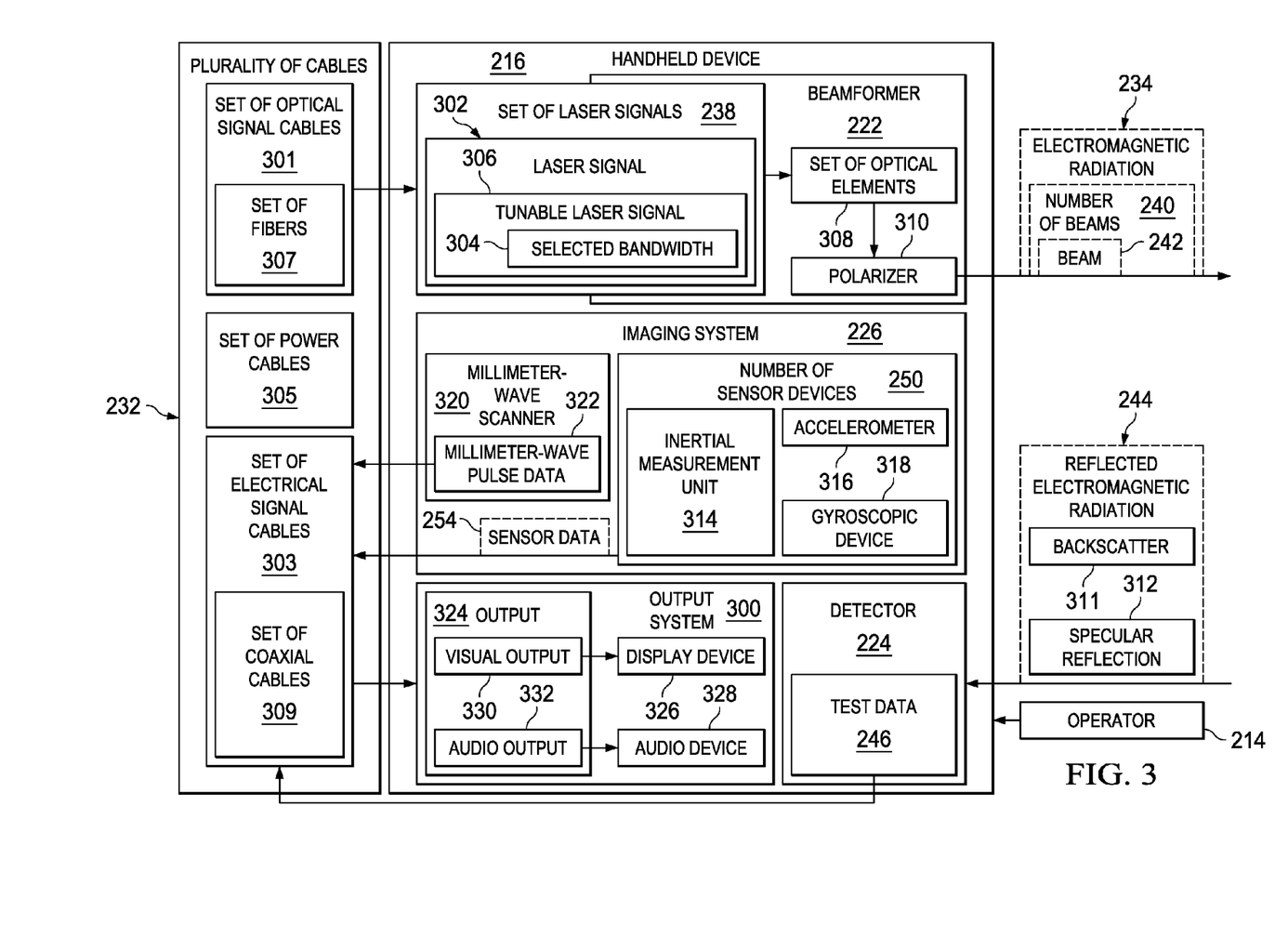
FIG. 3 is an illustration of a handheld device in greater detail in the form of a block diagram in accordance with an illustrative embodiment.

With reference now to FIG. 3, an illustration of handheld device 216 from FIG. 2 is depicted in greater detail in the form of a block diagram in accordance with an illustrative embodiment. As depicted in this example, handheld device 216 includes beamformer 222, detector 224, imaging system 226, and output system 300.

Plurality of cables 232 connects to handheld device 216. Plurality of cables 232 may include, for example, without limitation, set of optical signal cables 301, set of electrical signal cables 303, and set of power cables 305. Each of set of optical signal cables 301 may be configured to carry one or more optical signals to handheld device 216. In one illustrative example, set of optical signal cables 301 takes the form of set of fibers 307. Set of fibers 307 may be, for example, a set of fiber-optic cables.

Each of set of electrical signal cables 303 is configured to carry one or more electrical signals to handheld device 216, from handheld device 216, or both. In one illustrative example, set of electrical signal cables 303 takes the form of set of coaxial cables 309. Further, set of power cables 305 is configured to carry power to handheld device 216.

Beamformer 222 receives set of laser signals 238 through set of optical signal cables 301. Laser signal 302 is an example of one of set of laser signals. Laser signal 302 may be tuned to selected bandwidth 304, which may be one of set of selected bandwidths 236 from FIG. 2. In this manner, laser signal 302 may be referred to as tunable laser signal 306.

In one illustrative example, beamformer 222 includes set of optical elements 308. In some cases, beamformer 222 may also include polarizer 310. Laser signal 302 may pass through set of optical elements 308 such that beam 242 may be formed. Polarizer 310 may polarize electromagnetic radiation 234 in beam 242. In this manner, beam 242 may be a polarized beam.

Beam 242 may be transmitted towards surface 206 in FIG. 2. At least a portion of electromagnetic radiation 234 in beam 242 may be reflected off of surface 206 to form reflected electromagnetic radiation 244.

Depending on the implementation, reflected electromagnetic radiation 244 may include at least one of backscatter 311 or specular reflection 312. Backscatter 311 is the diffuse reflection of electromagnetic radiation 234 off of surface 206 due to scattering. Specular reflection 312 is the direct reflection of electromagnetic radiation 234 off of surface 206 in a single direction.

In response to receiving reflected electromagnetic radiation 244, detector 224 generates test data 246. Test data 246 may be sent from handheld device 216 to base unit 218 in FIG. 2 wirelessly or over at least one of set of electrical signal cables 303.

In this illustrative example, imaging system 226 includes millimeter-wave scanner 320 and number of sensor devices 250. Number of sensor devices 250 may generate sensor data 254 and may include at least one of inertial measurement unit 314, accelerometer 316, or gyroscopic device 318.

Millimeter-wave scanner 320 may be an example of one implementation for radio system 248 in FIG. 2. Millimeter-wave scanner 320 may include a transmitter for transmitting millimeter-waves towards surface 206. In one illustrative example, the millimeter-waves may be transmitted as a number of pulses.

Millimeter-wave scanner 320 may also include a receiver for detecting millimeter-waves that reflect off of surface 206. In response to detecting these reflected millimeter-waves, millimeter-wave scanner generates millimeter-wave pulse data 322. Millimeter-wave pulse data 322 may be an example of one implementation for radio response data 252 in FIG. 2.

Sensor data 254 and millimeter-wave pulse data 322 may be sent from handheld device 216 to base unit 218 in FIG. 2 wirelessly or over at least one of set of electrical signal cables 303. Sensor data 254 and millimeter-wave pulse data 322, and in some cases, test data 246, may be used by base unit 218 to generate imaging data 247 in FIG. 2.

Result information 260 in FIG. 2, and in some cases, imaging data 247 in FIG. 2, may be processed by base unit 218 in FIG. 2 to generate output 324. Output 324 may be received at handheld device 216 from base unit 218 wirelessly or over at least one of set of electrical signal cables 303.

In this illustrative example, output 324 may be sent to output system 300 in handheld device 216. Output system 300 presents output 324 to operator 214 in a manner that operator 214 can easily comprehend. As one illustrative example, output system 300 may include display device 326, audio device 328, or both.

Output 324 may include, for example, visual output 330. Display device 326 may visually present visual output 330 to operator 214. Visual output 330 may include at least one of a number of images, an indication of the results of the testing of surface 206 in FIG. 2, or other information.

In another illustrative example, output 324 may include audio output 332. Audio device 328 may audibly present audio output 332. For example, without limitation, audio device 328 may take the form of a speaker that plays audio output 332. Audio output 332 may include at least one of a tone or audible message that indicates the result of the testing of surface 206 in FIG. 2.

Figure 4:
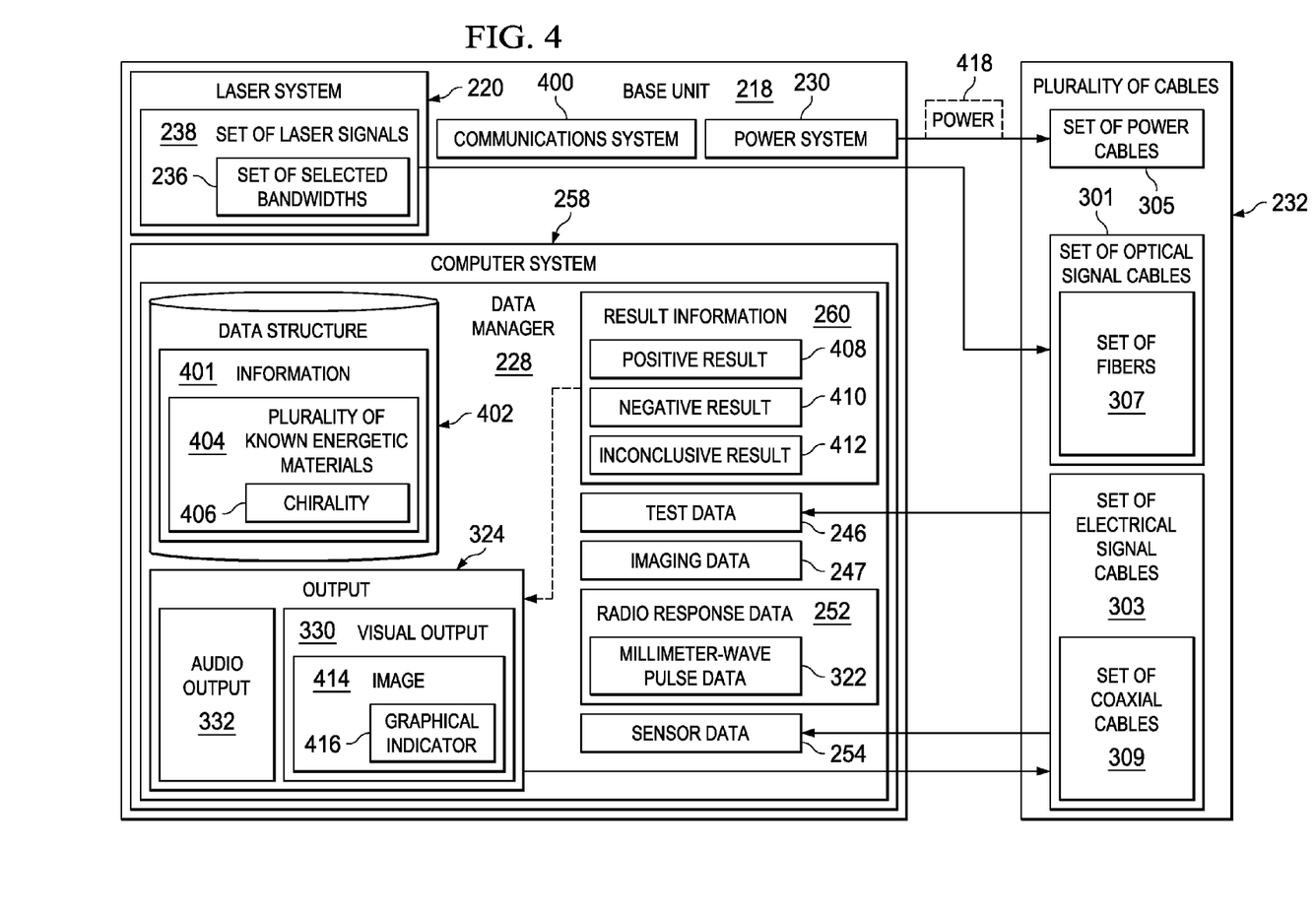
FIG. 4 is an illustration of a base unit in greater detail in the form of a block diagram in accordance with an illustrative embodiment.

With reference now to FIG. 4, an illustration of base unit 218 from FIG. 2 is depicted in greater detail in the form of a block diagram in accordance with an illustrative embodiment. As depicted in this example, base unit 218 includes laser system 220, data manager 228, and power system 230. In some illustrative examples, base unit 218 may also include communications system 400.

As described above, laser system 220 generates electromagnetic radiation 234 from FIG. 2 in the form of set of laser signals 238 that spans set of selected bandwidths 236. Set of laser signals 238 may be transmitted from base unit 218 to handheld device 216 from FIGS. 2-3 over set of optical signal cables 301.

Data manager 228 in base unit 218 may receive test data 246 from handheld device 216 either wirelessly or over at least one of set of electrical signal cables 303. Data manager 228 processes test data 246 to generate result information 260.

In one illustrative example, data manager 228 uses information 401 stored in data structure 402 to process test data 246. Data structure 402 may be implemented using at least one of a database, a spreadsheet, a table, or some other type of data structure.

Information 401 may be about plurality of energetic materials 404. For example, without limitation, data manager 228 may compare test data 246 to information 401 about plurality of known energetic materials 404 to determine whether one of plurality of known energetic materials 404 is present. In some cases, number of beams 240 formed by beamformer 222 in FIG. 2 may be generated by laser system 220 in a manner that enables energetic materials having chirality 406 to be detected. An energetic material that has chirality 406 may comprise one or more chiral molecules. As one illustrative example, number of beams 240 in FIG. 2 may comprise polarized electromagnetic radiation that is specifically suited to detecting chiral molecules.

Data manager 228 processes test data 246 using information 401 to generate result information 260. In one illustrative example, result information 260 includes positive result 408, negative result 410 or inconclusive result 412. Positive result 408 indicates that at least one of plurality of known energetic materials 404 has been detected on surface 206 in FIG. 2. Negative result 410 indicates that none of plurality of known energetic materials 404 have been detected on surface 206 in FIG. 2. Further, inconclusive result 412 indicates that test data 246 is inconclusive and a determination as to whether one of plurality of known energetic materials 404 cannot be definitely made.

By processing test data 246 within base unit 218, the weight and size of computer system 258 on which data manager 228 is implemented is kept on base unit 218 instead of handheld device 216, which enables handheld device 216 in FIGS. 2-3 to be kept small in size and thereby, easily manageable by operator 214 in FIGS. 2-3. Further, test data 246 may be quickly processed by data manager 228 such that result information 260 may be generated in less than about 10 seconds.

When base unit 218 receives sensor data 254 and radio response data 252 from handheld device 216 either wirelessly or over at least one of set of electrical signal cables 303, base unit 218 processes this data to generate imaging data 247. In one illustrative example, imaging data 247 and result information 260 are used to form output 324.

As described earlier in FIG. 3, output 324 may include visual output 330, audio output 332, or both. In one illustrative example, visual output 330 includes image 414. Image 414 may be a two-dimensional image or a three-dimensional image of surface 206 from FIG. 2. Visual output 330 may also include graphical indicator 416 that may be overlaid over image 414. Graphical indicator 416 may indicate, for example, without limitation, whether testing led to positive result 408, negative result 410, or inconclusive result 412. Graphical indicator 416 may be comprised of at least one of a graphical symbol, a text message, a label, a visual alert, or some other type of graphical indicator.

Output 324 may be sent to handheld device 216 either wirelessly or over at least one of set of electrical signal cables 303. Output 324 may then be presented to operator 214 from FIGS. 2-3 on handheld device 216 in FIGS. 2-3.

Figure 5:
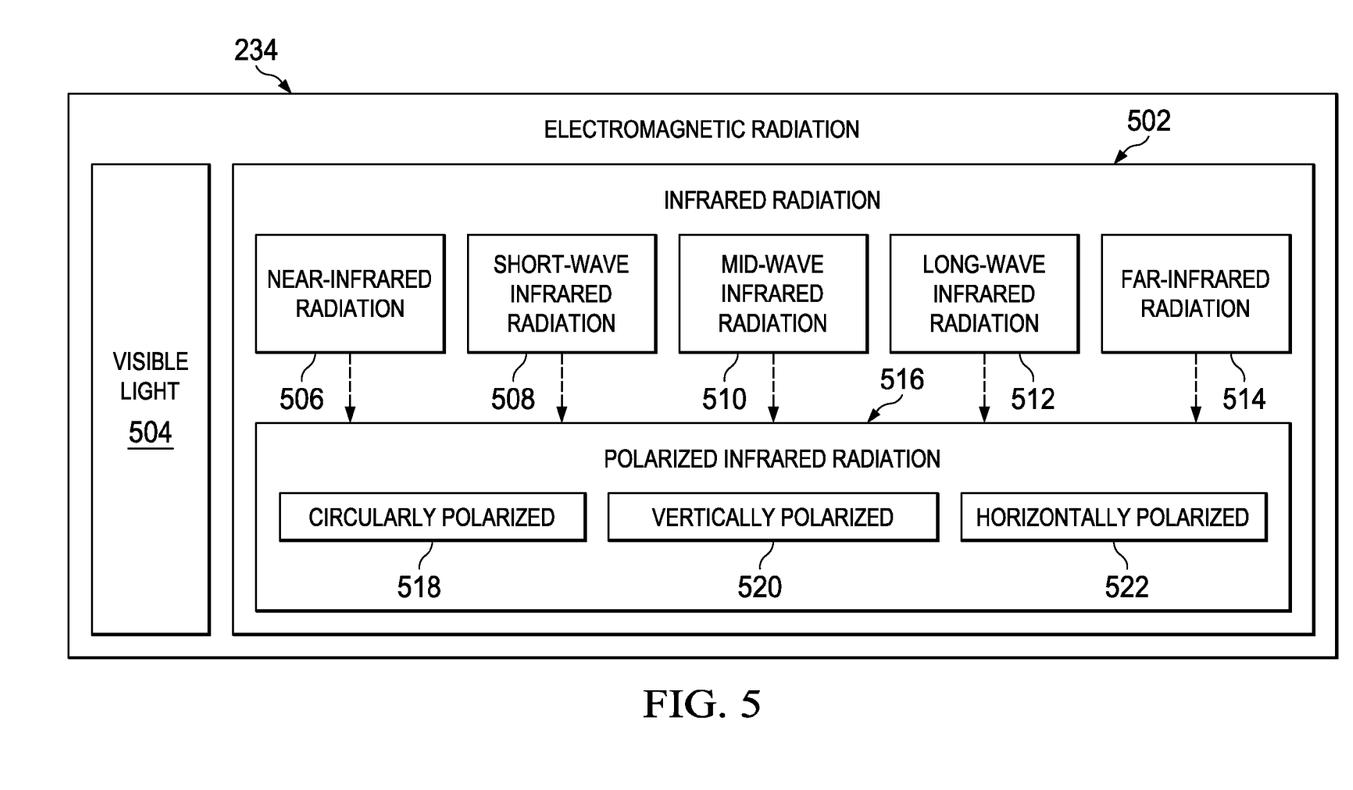
FIG. 5 is an illustration of different forms of electromagnetic radiation in the form of a block diagram in accordance with an illustrative embodiment.

With reference now to FIG. 5, an illustration of different forms of electromagnetic radiation 234 from FIG. 2 is depicted in the form of a block diagram in accordance with an illustrative embodiment. As depicted, electromagnetic radiation 234 may include at least one of infrared radiation 502 or visible light 504.

Infrared radiation 502 may include different types of radiation. For example, without limitation, infrared radiation 502 may include at least one of near-infrared radiation 506, short-wave infrared radiation 508, mid-wave infrared radiation 510, long-wave infrared radiation 512, or far-infrared radiation 514.

In some cases, infrared radiation 502 may be polarized infrared radiation 516. Polarized infrared radiation 516 may be circularly polarized 518, vertically polarized 520, or horizontally polarized 522, depending on the implementation. Polarized infrared radiation 516 that is circularly polarized 518 may be specifically suited to detecting different types of energetic materials that have chiral molecules. In particular, long-wave infrared radiation 512 that is circularly polarized 518 may be specifically suited to detecting different types of energetic materials that have chiral molecules.

Other types of circularly polarized electromagnetic radiation may also be specifically suited to detecting different types of energetic materials that have chiral molecules. For example, without limitation, circularly polarized visible light, circularly polarized millimeter waves, or circularly polarized microwave radiation may be used for detecting chirality.

Detection system 202 as described in FIGS. 2-5 provides a method and apparatus for detecting a wide variety of energetic materials rapidly and effectively. The total time between the generation of set of laser signals 238 comprising electromagnetic radiation 234 to the presentation of output 324 on handheld device 216 may be less than about 10 seconds. Further, detection system 202 may be cost-effective and may be easy for operator 214 to handle and operate.

The illustration of detection system 202 in FIG. 2, handheld device 216 in FIG. 3, base unit 218 in FIG. 4, plurality of cables 232 in FIGS. 3-4, and electromagnetic radiation 234 in FIG. 5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, handheld device 216 may be interchangeable with different types of base units. For example, without limitation, handheld device 216 may be connected to different types of base units for performing different types of testing. In other illustrative examples, laser system 220 in base unit 218 may be replaceable with a different laser system. In this manner, a single base unit 218 may be configured for use with different types of laser systems.

Figure 6:
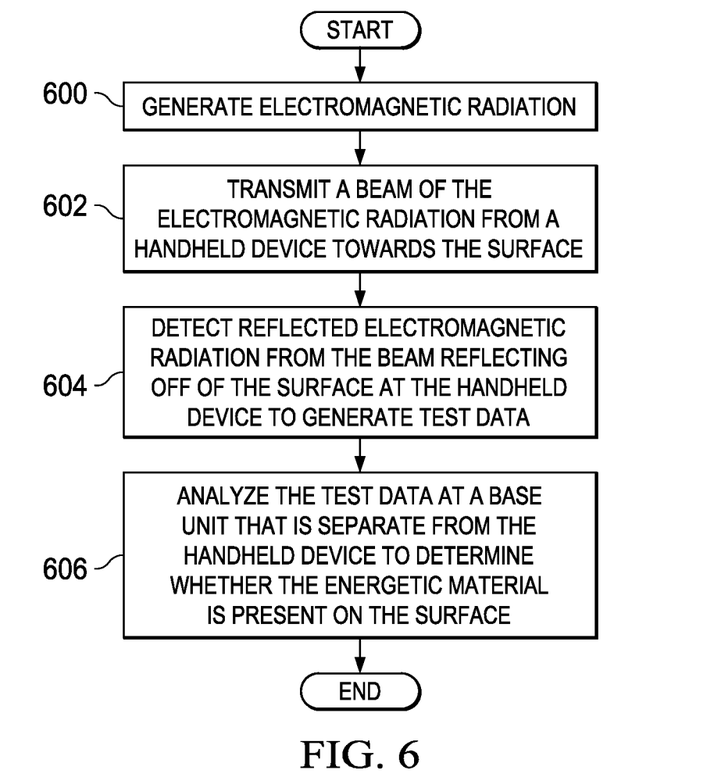
FIG. 6 is an illustration of a process for detecting an energetic material on a surface in the form of a flowchart in accordance with an illustrative embodiment.

With reference now to FIG. 6, an illustration of a process for detecting an energetic material on a surface is depicted in the form of a flowchart in accordance with an illustrative embodiment. The process illustrated in FIG. 6 may be implemented using a detection system, such as detection system 202 in FIG. 2.

The process begins by generating electromagnetic radiation (operation 600). Next, a beam of the electromagnetic radiation is transmitted from a handheld device towards the surface (operation 602). Then, reflected electromagnetic radiation from the beam reflecting off of the surface is detected at the handheld device to generate test data (operation 604). The test data is analyzed at a base unit that is separate from the handheld device to determine whether the energetic material is present on the surface (operation 606), with the process terminating thereafter.

Figure 7:
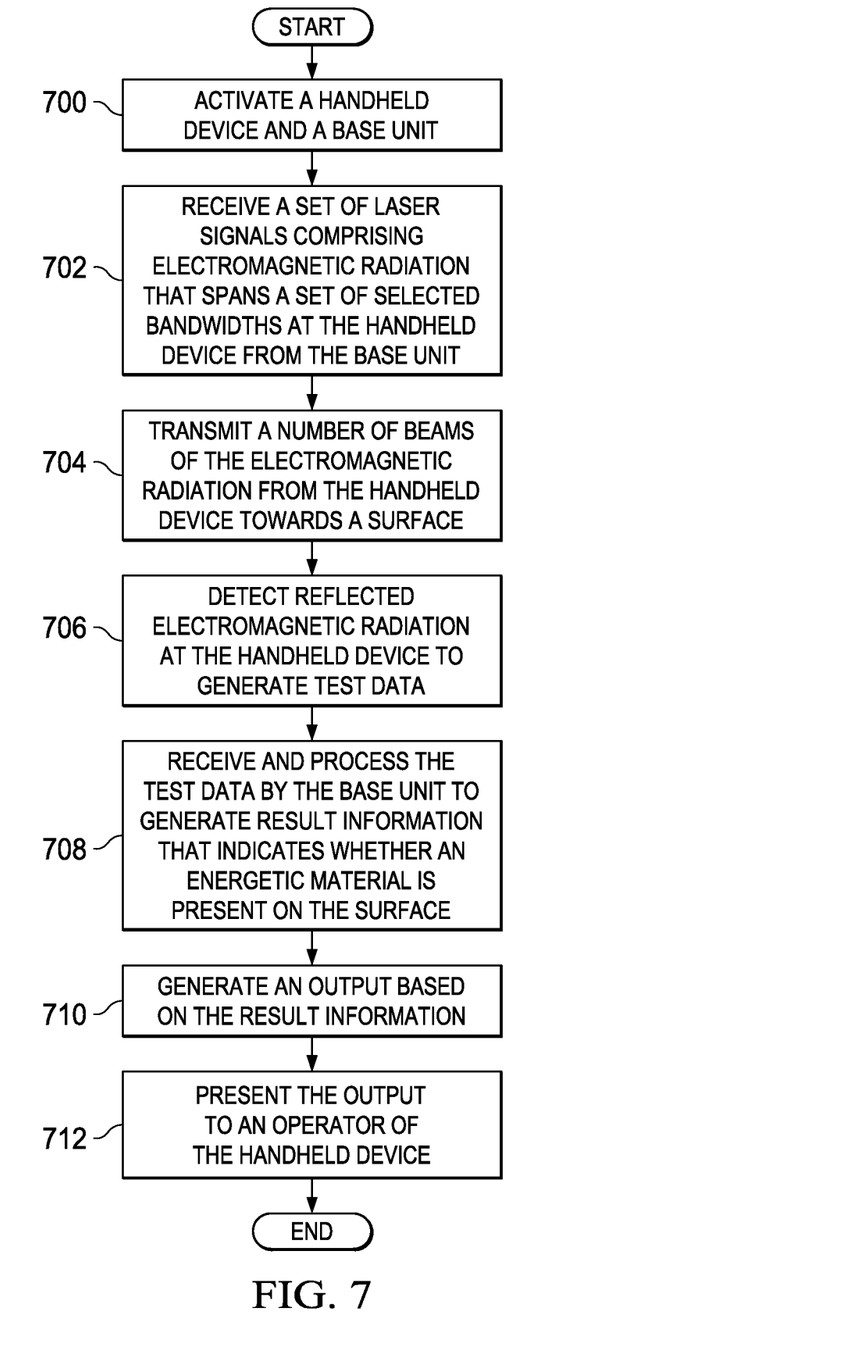
FIG. 7 is an illustration of a process for detecting an energetic material on a surface in the form of a flowchart in accordance with an illustrative embodiment.

With reference now to FIG. 7, an illustration of a process for detecting an energetic material on a surface is depicted in the form of a flowchart in accordance with an illustrative embodiment. The process illustrated in FIG. 7 may be implemented using a detection system, such as detection system 202 in FIG. 2.

The process begins by activating a handheld device and a base unit (operation 700). Next, a set of laser signals comprising electromagnetic radiation that spans a set of selected bandwidths are received at the handheld device from the base unit (operation 702). A number of beams of the electromagnetic radiation are then transmitted from the handheld device towards a surface (operation 704).

Reflected electromagnetic radiation is detected at the handheld device to generate test data (operation 706). The test data is received and processed by the base unit to generate result information that indicates whether an energetic material is present on the surface (operation 708).

Thereafter, an output is generated based on the result information (operation 710). The output is then presented to an operator of the handheld device (operation 712), with the process terminating thereafter. Once the output is presented to the operator of the handheld device, the operator may be able to take any necessary actions based on the output.

Figure 8:
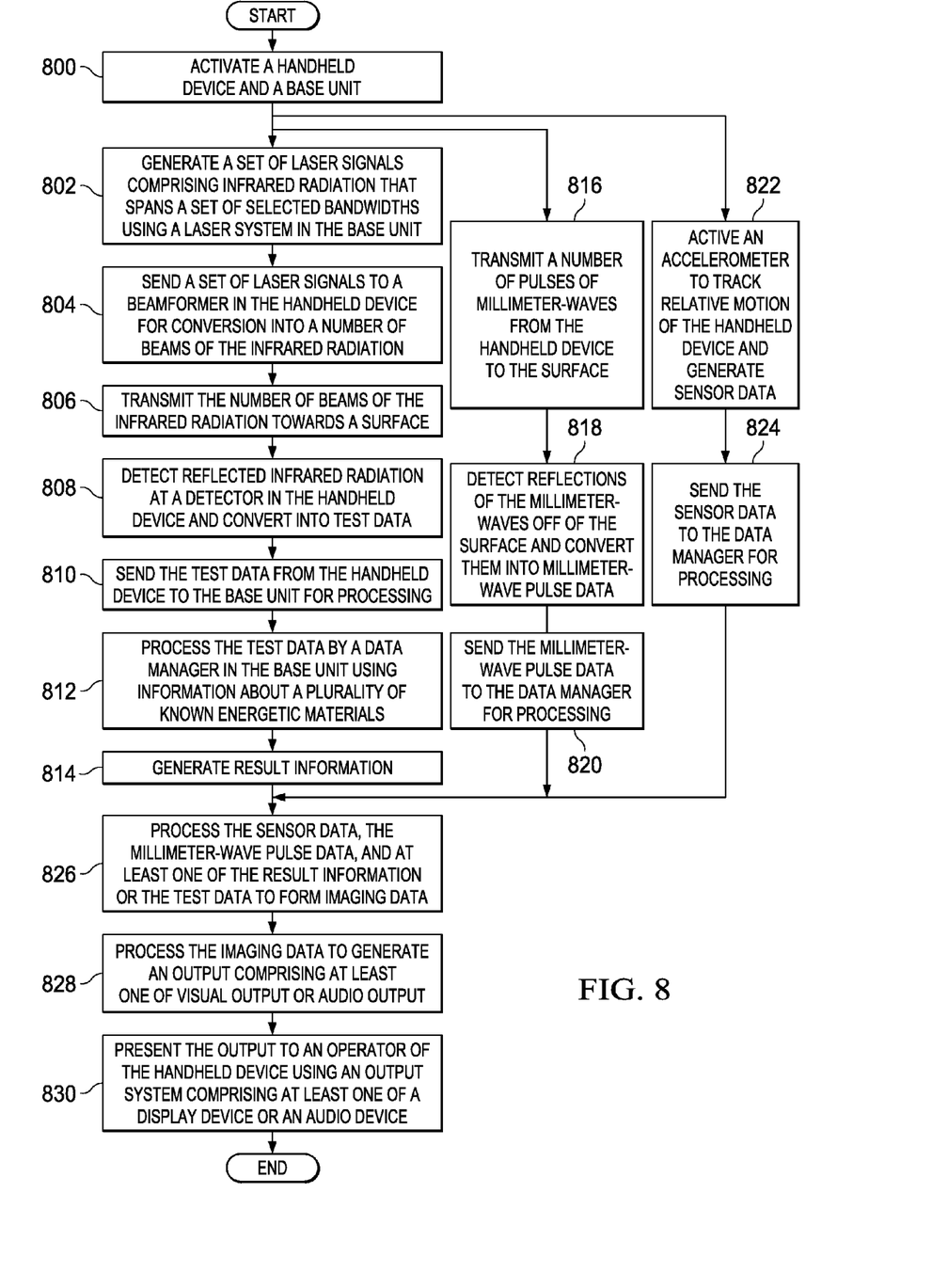
FIG. 8 is an illustration of a process for detecting an energetic material on a surface in the form of a flowchart in accordance with an illustrative embodiment.

With reference now to FIG. 8, an illustration of a process for detecting an energetic material on a surface is depicted in the form of a flowchart in accordance with an illustrative embodiment. The process illustrated in FIG. 8 may be implemented using a detection system, such as detection system 202 in FIG. 2.

The process begins by activating a handheld device and a base unit (operation 800). Next, a set of laser signals comprising infrared radiation that spans a set of selected bandwidths are generated using a laser system in the base unit (operation 802).

The set of laser signals are sent to a beamformer in the handheld device for conversion into a number of beams of the infrared radiation (operation 804). In one illustrative example, the number of beams formed are of polarized infrared radiation. In some cases, the polarized infrared radiation may be circularly polarized long-wave infrared radiation.

The number of beams of the infrared radiation are transmitted towards a surface (operation 806). Reflected infrared radiation is then detected at a detector in the handheld device and converted into test data (operation 808). The test data is sent from the handheld device to the base unit for processing (operation 810).

The test data is processed by a data manager in the base unit using information about a plurality of known energetic materials (operation 812). Result information is generated (operation 814).

With reference again to operation 800, after the handheld device and base unit have been activated, a number of pulses of millimeter-waves are transmitted from the handheld device to the surface (operation 816). Reflections of the millimeter-waves off of the surface are detected and converted into millimeter-wave pulse data (operation 818). The millimeter-wave pulse data is sent to the data manager for processing (operation 820).

With reference yet again to operation 800, after the handheld device and base unit have been activated, an accelerometer is activated to track relative motion of the handheld device and generate sensor data (operation 822). The sensor data are sent to the data manager for processing (operation 824).

The sensor data, the millimeter-wave pulse data, and at least one of the result information or the test data are processed to form imaging data (operation 826). The imaging data is further processed to generate an output comprising at least one of visual output or audio output (operation 828). The output is presented to an operator of the handheld device using an output system comprising at least one of a display device or an audio device (operation 830), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
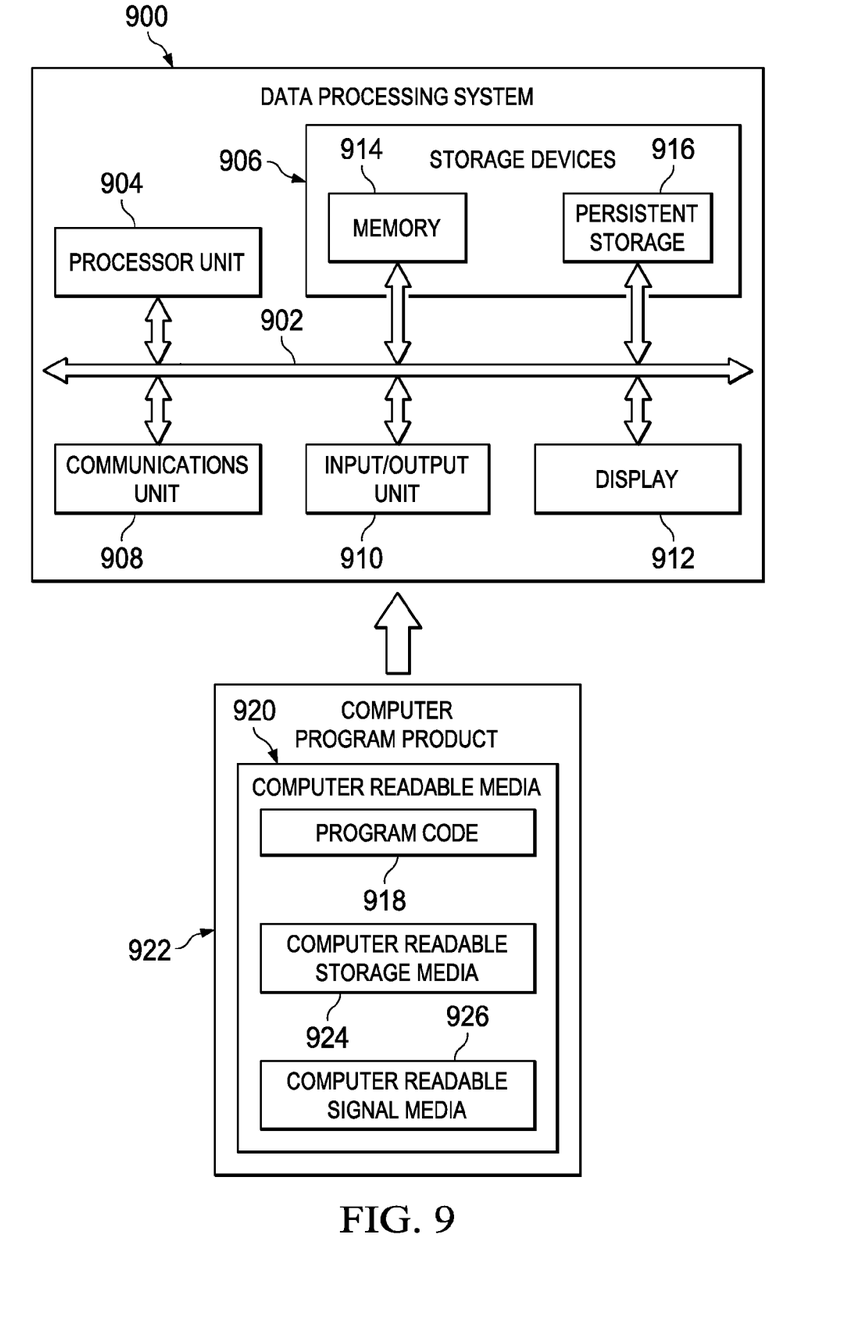
FIG. 9 is an illustration of a data processing system in the form of a block diagram in accordance with an illustrative embodiment.

Turning now to FIG. 9, an illustration of a data processing system in the form of a block diagram is depicted in accordance with an illustrative embodiment. Data processing system 900 may be used to implement computer system 258 in FIG. 2. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application-specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components in addition to or in place of those illustrated for data processing system 900. Further, components shown in FIG. 9 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting an energetic material on a surface, the method comprising:
   generating electromagnetic radiation at a base unit;
   transmitting the electromagnetic radiation over an optical signal cable from the base unit to a handheld device that is separate from the base unit;
   transmitting a beam of the electromagnetic radiation from the handheld device towards the surface;
   detecting reflected electromagnetic radiation from the beam reflecting off of the surface and converting the reflected electromagnetic radiation into electrical signals at the handheld device to generate test data;
   transmitting radio waves from the handheld device towards the surface;
   detecting reflected radio waves at the handheld device from the radio waves reflecting off of the surface to generate radio response data;
   sending the test data and the radio response data from the handheld device to the base unit that is separate from the handheld device;
   analyzing the test data at the base unit that is separate from the handheld device to generate result information that indicates whether the energetic material is present on the surface;
   generating an image of the surface by the base unit using the radio response data;
   generating an output using the result information, wherein the output comprises a graphical indicator overlaid on the image of the surface, and wherein the graphical indicator indicates whether the energetic material is present on the surface; and
   presenting the output on the handheld device.

2. The method of claim 1, wherein generating the electromagnetic radiation comprises:
   generating infrared radiation using a laser system that is associated with the base unit,
      wherein the infrared radiation is selected from one of near-infrared radiation, short-wave infrared radiation, mid-wave infrared radiation, long-wave infrared radiation, and far-infrared radiation.

3. The method of claim 2 further comprising:
   transmitting the infrared radiation from the base unit to the handheld device using a set of optical signal cables.

4. The method of claim 1, wherein detecting the reflected electromagnetic radiation comprises:
   detecting at least one of backscatter or specular reflection of the beam from the surface at the handheld device.

5. The method of claim 1 further comprising:
   generating sensor data using at least one of an accelerometer, an inertial measurement unit, or a gyroscopic device at the handheld device.

6. The method of claim 5 further comprising:
   generating imaging data of the surface based on at least one of the sensor data, the test data, or the radio response data.

7. The method of claim 1 further comprising:
   processing the test data at a data manager associated with the base unit to generate the result information that indicates whether the energetic material is present on the surface;
   generating the output by the base unit using the result information;
   sending the output from the base unit to the handheld device; and
   presenting the output at the handheld device using an output system associated with the handheld device.

8. An apparatus comprising:
a handheld device that is configured to transmit a beam of electromagnetic radiation towards a surface, detect reflected electromagnetic radiation from the beam reflecting off of the surface, convert the reflected electromagnetic radiation into electrical signals to generate test data, transmit radio waves towards the surface, detect reflected radio waves from the radio waves reflecting off of the surface to generate radio response data, send the test data and the radio response data to a base unit that is separate from the handheld device, receive an output from the base unit, and present the output received from the base unit; and
the base unit that is separate from the handheld device and that is configured to generate the electromagnetic radiation, transmit the electromagnetic radiation over an optical signal cable to the handheld device, receive the test data and the radio response data from the handheld device analyze the test data to generate result information that indicates whether an energetic material is present on the surface, generate an image of the surface using the radio response data, generate an output using the result information, and send the output to the handheld device, wherein the output comprises a graphical indicator overlaid on the image of the surface, and wherein the graphical indicator indicates whether the energetic material is present on the surface.

9. The apparatus of claim 8 further comprising:
a laser system associated with the base unit, wherein the laser system is configured to generate a set of laser signals comprising the electromagnetic radiation and wherein the electromagnetic radiation is infrared radiation.

10. The apparatus of claim 9 further comprising:
a set of optical signal cables for transmitting the infrared radiation from the base unit to the handheld device.

11. The apparatus of claim 8, wherein the handheld device comprises:
a detector that is configured to detect the reflected electromagnetic radiation as at least one of backscatter or specular reflection of the beam from the surface to generate the test data.

12. The apparatus of claim 8, wherein the base unit comprises:
a data manager that is configured to analyze the test data to generate the result information.

13. The apparatus of claim 12, wherein the data manager is configured to analyze the test data using information about a plurality of known energetic materials to generate the result information.

14. The apparatus of claim 8, wherein the handheld device comprises:
a radio system that is configured to transmit the radio waves towards the surface and detect the reflected radio waves to generate the radio response data.

15. The apparatus of claim 14, wherein the handheld device comprises:
a number of sensor devices that are configured to generate sensor data, wherein the number of sensor devices includes at least one of an accelerometer, an inertial measurement unit, or a gyroscopic device.

16. The apparatus of claim 15, wherein the base unit comprises:
a data manager that is configured to generate imaging data of the surface based on at least one of the test data, the sensor data, or the radio response data.

17. The apparatus of claim 16, wherein the data manager is configured to generate the output using the imaging data and the result information generated based on the test data, and wherein the handheld device comprises:
an output system that is configured to present the output to an operator of the handheld device.

18. A detection system comprising:
a handheld device comprising:
a beamformer that is configured to transmit a beam of polarized infrared radiation towards a surface to be tested,
a detector that is configured to detect reflected infrared radiation from the beam reflecting off of the surface, convert the reflected electromagnetic radiation into electrical signals to generate test data, and send the test data to a base unit that is separate from the handheld device,
a radio system that is configured to transmit radio waves towards the surface, detect the reflected radio waves to generate radio response data, and send the radio response data to the base unit, and
an output system that is configured to present an output to an operator of the handheld device; and
the base unit that is separate from the handheld device and comprises:
a laser system that is configured to generate a set of laser signals comprising the polarized infrared radiation that spans a set of selected bandwidths and to send the set of laser signals to the beamformer, and
a data manager that is configured to analyze the test data to generate result information that indicates whether an energetic material is present on the surface, generate an image of the surface using the radio response data, generate an output using the result information, and send the output to the handheld device, wherein the output comprises a graphical indicator overlaid on the image of the surface, and wherein the graphical indicator indicates whether the energetic material is present on the surface.

19. The method of claim 1, wherein the electromagnetic radiation comprises polarized long-wave infrared radiation.

* * * * *